United States Patent
Das et al.

(10) Patent No.: US 10,002,063 B2
(45) Date of Patent: Jun. 19, 2018

(54) MONITORING PERFORMANCE OF MULTITHREADED WORKLOADS

(71) Applicant: INTERNATIONAL BUSINESS MACHINES CORPORATION, Armonk, NY (US)

(72) Inventors: Rajarshi Das, Bangalore (IN); Philip L. Vitale, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 149 days.

(21) Appl. No.: 14/918,200

(22) Filed: Oct. 20, 2015

(65) Prior Publication Data

US 2017/0109251 A1    Apr. 20, 2017

(51) Int. Cl.
| | |
|---|---|
| *G06F 9/46* | (2006.01) |
| *G06F 11/34* | (2006.01) |
| *G06F 9/50* | (2006.01) |
| *G06F 9/455* | (2018.01) |
| *G06F 11/30* | (2006.01) |

(52) U.S. Cl.
CPC ...... *G06F 11/3414* (2013.01); *G06F 9/45558* (2013.01); *G06F 9/5077* (2013.01); *G06F 9/5083* (2013.01); *G06F 11/3006* (2013.01); *G06F 2009/45583* (2013.01); *G06F 2009/45591* (2013.01)

(58) Field of Classification Search
CPC ............. G06F 11/3414; G06F 9/45558; G06F 9/5077; G06F 9/5083; G06F 11/3006; G06F 2009/45583; G06F 2009/45591

USPC ............................................................ 718/1
See application file for complete search history.

(56) References Cited

U.S. PATENT DOCUMENTS

| | | | |
|---|---|---|---|
| 5,727,167 A | 3/1998 | Dwyer et al. | |
| 6,314,530 B1 | 11/2001 | Mann | |
| 6,360,337 B1 | 3/2002 | Zak et al. | |

(Continued)

FOREIGN PATENT DOCUMENTS

| | | |
|---|---|---|
| JP | 06-223558 A | 8/2006 |
| WO | 2014108747 A1 | 7/2014 |

OTHER PUBLICATIONS

Jack L. Lo et al., "An Analysis of Database Workload Performance on Simultaneous Multithreaded Processors", 1998 IEEE.

(Continued)

*Primary Examiner* — Camquy Truong
(74) *Attorney, Agent, or Firm* — Kunzler, PC

(57) ABSTRACT

Apparatuses, methods, systems, and computer program products are disclosed for monitoring performance of multithreaded workloads. A workload module starts a workload comprising one or more threads. The workload reaches a steady state after a period of time. A data module receives a first set of performance data for each thread in response to the workload reaching the steady state. The first set of performance data is received concurrently for each thread. The data module receives a second set of performance data for each thread a period of time after the first set of performance data is received. The second set of performance data is received concurrently for each thread. A result module calculates one or more performance metrics for each thread based on the first and second sets of performance data.

18 Claims, 6 Drawing Sheets

(56) References Cited

U.S. PATENT DOCUMENTS

| | | | |
|---|---|---|---|
| 6,507,921 B1 | 1/2003 | Buser et al. | |
| 6,556,952 B1 | 4/2003 | Magro | |
| 7,058,839 B2 | 6/2006 | Imming | |
| 7,197,586 B2 | 3/2007 | DeWitt et al. | |
| 7,334,162 B1* | 2/2008 | Vakrat | G06F 11/2294 714/38.1 |
| 7,797,503 B2 | 9/2010 | Bellofatto et al. | |
| 7,877,759 B2 | 1/2011 | Gara et al. | |
| 8,060,762 B2 | 11/2011 | Banginwar et al. | |
| 8,161,493 B2 | 4/2012 | Floyd et al. | |
| 8,181,185 B2 | 5/2012 | Junkins et al. | |
| 8,607,243 B2 | 12/2013 | Kumar et al. | |
| 2005/0086028 A1 | 4/2005 | Jones et al. | |
| 2007/0286327 A1 | 12/2007 | Love et al. | |
| 2008/0046700 A1 | 2/2008 | Gara et al. | |
| 2008/0163220 A1 | 7/2008 | Wang et al. | |
| 2008/0263263 A1 | 10/2008 | Love et al. | |
| 2009/0007134 A1 | 1/2009 | Chiu et al. | |
| 2010/0017789 A1* | 1/2010 | DeWitt, Jr. | G06F 11/3466 717/126 |
| 2010/0162247 A1 | 6/2010 | Welc et al. | |
| 2011/0173403 A1 | 7/2011 | Levin et al. | |
| 2011/0295587 A1 | 12/2011 | Eeckhout et al. | |
| 2012/0089979 A1 | 4/2012 | Adar et al. | |
| 2012/0304020 A1 | 11/2012 | Chiu et al. | |
| 2013/0332778 A1 | 12/2013 | Spracklen | |
| 2014/0143781 A1* | 5/2014 | Yao | G06F 9/4856 718/100 |
| 2014/0372807 A1* | 12/2014 | Poola | G06F 11/3452 714/39 |
| 2017/0097971 A1* | 4/2017 | Brown | G06F 17/30572 |

OTHER PUBLICATIONS

H. M. Mathis et al., "Characterization of simultaneous multithreading (SMT) efficiency in POWER5", 2005 IBM.

Pin, Eddy, "Hardware Performance Monitoring in Memory of NUMAchine Multiprocessor", University of Toronto (1997).

SYS-ED/Computer Education Techniques Inc., "Performance Counters", App. E (2003).

Final Office Action from U.S. Appl. No. 13/925,760, filed Jun. 24, 2013, dated Sep. 23, 2015.

* cited by examiner

MONITORING PERFORMANCE OF MULTITHREADED WORKLOADS

FIELD

The subject matter disclosed herein relates to computer performance monitoring and more particularly relates to monitoring the performance of a multithreaded workload.

BACKGROUND

Computing workloads may create additional threads of execution to simultaneously perform some of the work of the workload to increase efficiency and performance of the workload. Splitting up the work of a workload among multiple threads can execute the workload faster and more efficiently, but it may also make it more difficult to assess the performance of the workload, or, more particularly, the performance of each thread of the multithreaded workload. The efficient and accurate assessment of the performance of each thread of a multithreaded workload, however, is fundamental to calculating performance metrics that are associated with the threads and one or more workloads on a computing system.

BRIEF SUMMARY

An apparatus for monitoring performance of multi-threaded workloads is disclosed. A method and computer program product also perform the functions of the apparatus. In one embodiment, an apparatus includes a workload module that starts a workload that includes one or more threads executing on a computing device. The workload may reach a steady state after a period of time. The apparatus, in certain embodiments, includes a data module that receives a first set of performance data for each thread of the one or more threads in response to the workload reaching the steady state. The first set of performance data may be received concurrently for each thread of the one or more threads.

In another embodiment, the data module receives a second set of performance data for each thread of the one or more threads a period of time after the first set of performance data is received. The second set of performance data may be received concurrently for each thread of the one or more threads. The apparatus includes a result module that calculates one or more performance metrics for each thread of the one or more threads based on the first and second sets of performance data.

In one embodiment, the performance data is generated using a hardware element that captures performance data for the one or more threads without intervention by a software application. The hardware element may be external to a processor of the computing device. In a further embodiment, the performance data for each thread of the one or more threads is continuously captured according to a predetermined time interval while the computing device is powered-on. The predetermined time interval may be on an order of microseconds.

In one embodiment, the performance data is divided into a plurality of groups and stored in one or more memory elements of the computing device. In a further embodiment, the groups of performance data for each thread of the one or more threads are read from the one or more memory elements at the same time. In yet another embodiment, each group of the plurality of groups includes performance data for a plurality of events. The performance data may include counts for a plurality of different events associated with each thread of the one or more threads.

In one embodiment, the apparatus includes a group module that determines one or more groups of the plurality of groups that include one or more events associated with calculating the one or more performance metrics for the one or more threads. In a further embodiment, the plurality of groups includes one or more events that count one or more of: a number of constant clock cycles consumed while a processor is in a particular simultaneous multithreading mode, a number of constant clock cycles consumed while a simultaneous multithreading mode is in one of a user mode and a kernel mode, a number of instructions performed by the one or more threads while a processor is in a particular simultaneous multithreading mode, a number of clock cycles consumed by the one or more threads while a processor is in a particular simultaneous multithreading mode, and a number of constant clock cycles consumed for each thread of the one or more threads.

In one embodiment, the apparatus further includes an interval module that determines a measurement period clock for a group of the plurality of groups. The apparatus, in another embodiment, includes an interval update module that determines a time it takes to update a measurement period interval for the group as a function of the measurement period clock. The apparatus may also include an instruction count module that determines a number of instructions executed per second for each thread of the one or more threads as a function of a number of instructions executed for a thread and the time it takes to update the measurement period interval.

In one embodiment, the one or more calculated performance metrics include one or more of: a number constant clock cycles consumed while a processor is in a particular simultaneous multithreading mode, a number of constant clock cycles consumed while a simultaneous multithreading mode is in one of a user mode and a kernel mode, a number of instructions performed by each thread of the one or more threads while a processor is in a particular simultaneous multithreading mode, a number of clock cycles consumed by each thread of the one or more threads while a processor is in a particular simultaneous multithreading mode, a number of constant clock cycles consumed by each thread of the one or more threads that are declared online by the operating system, and a number of instructions per seconds performed by each thread of the one or more threads.

In one embodiment, the data module receives a third set of performance data for each thread of the one or more threads a period of time after the second set of performance data is received. The third set of performance data may be received concurrently for each thread of the one or more threads. The result module, in a further embodiment, calculates the one or more performance metrics for each thread of the one or more threads based on the second set of performance data and the third set of performance data. In certain embodiments, the workload includes one or more multi-threaded software applications that have a known startup period before reaching the steady state.

A method, in one embodiment, includes starting a workload comprising one or more threads executing on a computing device. The workload may reach a steady state after a period of time. The method may further include receiving a first set of performance data for each thread of the one or more threads in response to the workload reaching the steady state. The first set of performance data may be received concurrently for each thread of the one or more threads.

The method, in another embodiment, includes receiving a second set of performance data for each thread of the one or more threads a period of time after the first set of performance data is received. The second set of performance data may be received concurrently for each thread of the one or more threads. The method, in some embodiments, includes calculating one or more performance metrics for each thread of the one or more threads based on the first and second sets of performance data.

In one embodiment, the performance data is generated using a hardware element that captures performance data for the one or more threads without intervention by a software application. The hardware element may be external to a processor of the computing device. The performance data for each thread of the one or more threads, in one embodiment, is continuously captured according to a predetermined time interval while the computing device is powered-on. The predetermined time interval may be on an order of microseconds.

In some embodiments, the performance data is divided into a plurality of groups and stored in one or more memory elements of the computing device. The groups of performance data for each thread of the one or more threads may be read from the one or more memory elements at the same time. In a further embodiment, the method includes determining one or more groups of the plurality of groups that include one or more events associated with calculating the one or more performance metrics for the one or more threads. In some embodiments, each group of the plurality of groups includes performance data for a plurality of events. The performance data may include counts for a plurality of different events associated with each thread of the one or more threads.

In one embodiment, the method includes determining a measurement period clock for a group of the plurality of groups. In a further embodiment, the method includes determining a time it takes to update a measurement period interval for the group as a function of the measurement period clock. In yet another embodiment, the method includes determining a number of instructions executed per second for each thread of the one or more threads as a function of a number of instructions executed for a thread and the time it takes to update the measurement period interval.

A computer program product includes a computer readable storage medium having program instructions embodied therewith. The program instructions may be readable/executable by a processor to cause the processor to start a workload that includes one or more threads executing on a computing device. The workload may reach a steady state after a period of time. The program instructions may be readable/executable by a processor to cause the processor to receive a first set of performance data for each thread of the one or more threads in response to the workload reaching the steady state. The first set of performance data may be received concurrently for each thread of the one or more threads.

In a further embodiment, the program instructions may be readable/executable by a processor to cause the processor to receive a second set of performance data for each thread of the one or more threads a period of time after the first set of performance data is received. The second set of performance data may be received concurrently for each thread of the one or more threads. The program instructions may be readable/executable by a processor to cause the processor to calculate, by processor, one or more performance metrics for each thread of the one or more threads based on the first and second sets of performance data.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
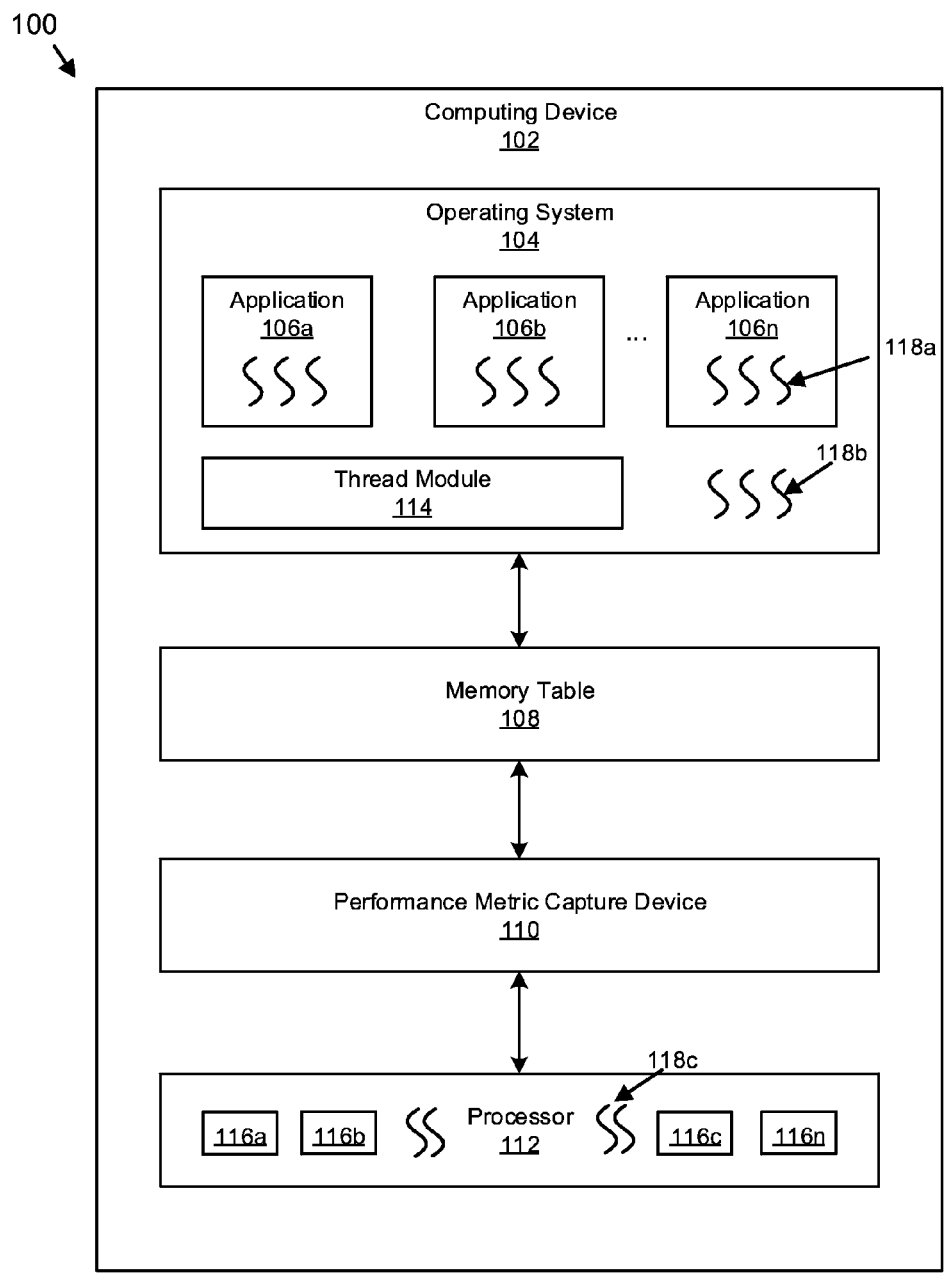
FIG. 1 is a schematic block diagram illustrating one embodiment of a system for monitoring performance of multithreaded workloads.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, include one or more physical or logical blocks of computer instructions which may, for instance, be organized as an object, procedure, or function. Nevertheless, the executables of an identified module need not be physically located together, but may include disparate instructions stored in different locations which, when joined logically together, include the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1 depicts one embodiment of a system 100 for monitoring performance of multithreaded workloads. In one embodiment, the system 100 includes a computing device 102, which may include an operating system 104, one or more applications 106a-n, and a thread module 114. The computing device 102, in further embodiments, includes a memory table 108, a performance metric capture device 110, a processor 112, which includes one or more processor cores 116a-n, and one or more software and/or hardware threads 118a-c.

In one embodiment, the computing device 102 includes a desktop computer, a laptop computer, a workstation, or the like. In certain embodiments, the computing device 102 includes handheld, mobile, or wearable devices, such as smart phones, tablet computers, smart watches, optical head-mounted displays, or the like. In one embodiment, the computing device 102 includes a server. The server may be configured as a database server, a file server, a mail server, a print server, a web server, a gaming server, an application server, or the like. In some embodiments, the computing device 102 is a networked computing device 102, such as a network server, that is remotely accessible via the internet (e.g., the cloud), an intranet, or the like. The computing device 102 may also include set-top boxes, gaming consoles, digital video recorders, or the like.

As is known in the art, the operating system 104 may be software that manages hardware and software resources and provides common services for computer programs executing on the computing device 102. The operating system 104 may include an instance of Microsoft Windows®, OS X®, a Linux®- or Unix®-based operating system, or the like. The operating system 104 may include operating systems developed for mobile devices, such as Apple iOS®, Google Android®, Windows Mobile®, Symbian®, WebOS®, or the like. The operating system 104 may be capable of executing one or more threads 118b, described below.

The one or more applications 106a-n, in one embodiment, include software applications that are configured to execute on the computing device 102 within the operating system 104 environment. The applications 106a-n may include email applications, productivity applications, database applications, gaming applications, web browser applications, multimedia applications, multimedia editing applications, or the like. In general, when the applications 106a-n are executed, the applications 106a-n consume a number of processor clock cycles to execute. Each application 106a-n may consume processor clock cycles at different rates. Moreover, each application 106a-n may be capable of executing one or more threads 118a, described below.

The memory table 108, in one embodiment, is located on a portion of memory located on the computing device 102, such as a portion of RAM, a portion of a cache, a portion of a register, a portion of a non-volatile storage device, or the like. The memory table 108, in certain embodiments, is configured to store performance data associated with the processor 112 and/or one or more threads 118a-c of execution. In some embodiments, the performance data is captured or generated by the performance metric capture device 110, described below, and stored in the memory table 108.

In one embodiment, the computing device 102 includes a plurality of memory tables 108 that are configured to store performance data associated with the processor 112, one or more threads 118a-c of execution, the overall performance of the computing device 102, the operating system 104, each application 106a-n, or a combination of the foregoing. For example, the computing device 102 may maintain a memory table 108 that stores performance data for the operating system 104, another memory table 108 that stores performance data for an application 106a, a memory table 108 that stores performance data for the computing device 102, a memory table 108 that stores performance data for a processor 112 or a processor core 116a-n, a memory table for each thread 118a-c of execution, or the like.

The performance metric capture device 110, in one embodiment, is configured to track, capture, generate, or otherwise collect performance data as it is related to the one or more threads 118a-c of execution. As used herein, performance data may include data associated with the threads 118a-c, which may include one or more characteristics, metrics, or the like that describe the performance of the threads 118a-c. In certain embodiments, the performance metric capture device 110 stores performance data in one or more fixed and/or configurable counters associated with the memory table 108. As used herein, counters may track, accumulate, or provide information about the workload of the threads 118a-c. The performance metric capture device 110 may maintain a plurality of counters that describe the performance of a thread 118a-c, an operating system 104, an application 106a-n, a processor 112 or processor core 116a-n, or the like. For example, the counters may include counters for various thread-related events for a period of time, such as the number of constant clock cycles that are consumed by a thread 118a-c while in a particular threading mode, the number of clock cycles consumed by a thread 118a-c while in a user mode or a kernel mode, the number of instructions executed by overlapping threads 118a-c, the number of constant clock cycles consumed by overlapping threads 118a-c, the number of clock cycles for threads 118a-c determined to be online by the operating system, or the like.

In certain embodiments, the performance metric capture device 110 is embodied as a chip, die, die plane, or the like. The performance metric capture device 110, in one embodiment, is separate from or external to the processor 112. In another embodiment, the performance metric capture device 110 is integrated into the processor 112. The performance metric capture device 110 may be configured to generate, track, capture, or otherwise collect performance data associated with the threads 118a-c when the computing device 102 is activated or powered on and continuously captures performance data for the threads 118a-c until the computing device 102 is shutdown. In this manner, the performance metric capture device 110 captures performance metrics for each thread 118a-c of a workload executing on the computing device 102 during the entire lifetime of the threads 118a-c or the workload.

Beneficially, unlike other performance metric solutions, the performance metric capture device 110 captures performance data without being configured by a software application such as an operating system 104 and/or an application 106a-n executing on the computing device 102. In this manner, the processor 112 does not consume clock cycles processing configuration instructions from the operating system 104 and/or an application 106a-n to configure the performance metric capture device 110. Moreover, configuration errors and/or failures may be eliminated by not configuring the performance metric capture device 110 using a software application, which ultimately increases the reliability of the system. Typically, the performance metric capture device 110 captures performance data during execution of the threads 118a-c without interrupting the threads 118a-c.

In one embodiment, the performance metric capture device 110 captures, tracks, generates, or collects performance data at predefined or predetermined intervals. For example, performance metric capture device 110 may capture and store performance data in the memory table 108 every 256 microseconds, 512 microseconds, 1 millisecond, 500 milliseconds, 1 second, or the like. The performance metric capture device 110, in certain embodiments, stores performance data in the memory table 108 according to time-multiplexed groups of thread events. In one embodiment, performance data for thread events may be divided into one or more groups of thread events. For example, there may be 128 different groups of thread events, with four thread events per group.

The performance data for all the groups may be time-multiplexed, meaning that the performance metric capture device 110 organizes the performance data in such a way that a full set of performance data for a group can be read during a predefined data read interval. For example, if the data read interval is one second, then a full set of performance data for a specific group can be read every one second. Furthermore, the performance metric capture device 110, in some embodiments, organizes performance data stored in the memory table 108 by thread 118a-c, application 106a-n, application type, operating system 104, processor 112, processor core 116a-n, logical partition, workload, or the like.

The processor 112, as is known in the art, is a processing unit of the computing device 102 that includes the electronic circuitry to carry out the instructions of a computer program, such as an operating system 104 or an application 106a-n, by performing the basic arithmetic, logic, control, and input/output ("I/O") operations specified by the instructions. The processor 112 may execute one or more instructions during a processor clock cycle. As used herein, a processor clock cycle is an amount of time between two pulses of an oscillator, otherwise known as the clock frequency. The clock cycle can be used to determine a processor's speed, which is typically measured in Hertz (Hz). In general, the higher number of pulses per second, the faster the computer processor 112 will be able to process information in the form of instructions.

A processor 112 may include a plurality of processing cores 116a-n-central processing units located on a single computing chip or die. The processor 112 may include physical cores, logical/virtual cores, or a combination of both. Moreover, the computing device 102 may include a plurality of processors 112. In certain embodiments, the performance metric capture device 110 organizes captured performance data by processor 112 and/or processor core 116a-n. In some embodiments, the processor 112 may be a multithreaded POWER8® processor by IBM® of Armonk, N.Y.

The thread module 114, in one embodiment, is configured to calculate performance metrics for one or more threads 118a-c using the performance data captured by the performance metric capture device 110. In one embodiment, the thread module 114 starts a multithreaded workload that reaches a steady state within a known period of time. The thread module 114, in another embodiment, receives a first set of performance data for each thread 118a-c executing on the computing device 102 after the workload reaches a steady state. In certain embodiments, the thread module 114 receives the first set of performance data concurrently, or at the same time, for each different thread 118a-c executing on the computing device 102.

The thread module 114, in a further embodiment, receives a second set of performance data for each thread 118a-c executing on the computing device 102 a period of time after the first set of performance data is received. In certain embodiments, the thread module 114 receives the set of performance data concurrently, or at the same time, for each different thread 118a-c executing on the computing device 102. The thread module 114 calculates one or more performance metrics for each thread 118a-c executing on the computing device 102 based on the first and second sets of performance data, as described in more detail below. The thread module 114 can provide multiple concurrent and accurate views of the multithreaded workload's performance using the highly precise and continuously captured performance data generated by the performance metric capture device 110, which is captured at a microsecond granularity. Furthermore, because the performance data is received concurrently for each different thread 118a-c, the thread module 114 can calculate performance metrics for each thread 118a-c at the same time to provide concurrent and accurate/precise (e.g., on the order or microseconds) performance assessments for each thread 118a-c. The thread module 114 is described in more detail below with reference to FIGS. 3 and 4.

As described above, the computing device 102 may execute one or more threads 118a-c. A thread 118a-c of execution, as used herein, is the smallest sequence of programmed instructions that can be managed independently by an operating system 104, an application 106a-n, a processor 112, a processor core 116a-n, or the like. As depicted in FIG. 1, an operating system 104 and/or an application 106a-n may execute threads 118a-b that execute instructions for the operating system 104 and/or the application 106a-n. In such an embodiment, the threads 118a-b may be software threads, or threads 118a-b that are executed on a processor 112 or processor core 116a-n and are managed using time division multiplexing (a.k.a. time-slicing or multitasking) where the processor 112 or processor core 116a-n switches between different software threads 118a-c every few milliseconds, for example.

In some embodiments where the computing device includes a plurality of processors 112 and/or processor cores 116a-n on each processor 112, threads 118a-b can be executed in a true concurrent manner where each processor 112 or processor core 116a-n executes different threads 118a-b simultaneously. In such an embodiment, the computing device 102 (e.g., the operating system 104) may use hardware threads 118c that exist as a hardware-supported method for better utilization of a particular processor 112, unlike software threads 118a-b that are pure software constructs with no processor-level representation. Thus, a hardware thread 118c can be embodied as a physical processor 112 or processor core 116a-n. For example, a four-core processor 112 can support four hardware threads at one time. One hardware thread 118a-c can run many software threads 118a-b using time-slicing described above.

In some embodiments, a thread 118a-c can be in user or system states while doing useful work. A thread 118a-c, in another embodiment, could be waiting for input/output or it could be idle. No matter the state that the thread 118a-c is in, the clock cycles consumed by the thread 118a-c will be counted if a "run-latch" bit is set. When a thread 118a-c is unused, the operating system 104 may turn off the "run-latch" bit and hand the thread 118a-c over to a hypervisor 208 to use, for example, put the thread 118a-c in a sleep ("NAP") state. For example, if there are eight threads 118a-c that are designated as being online, but only four of the threads 118a-c are currently doing useful work, the operating system 104 may turn off the "run-latch" bit for the four threads 118a-c that are not doing useful work and put them to sleep. In response to the operating system 104 setting four threads 118a-c to sleep, the simultaneous multithreading mode for the computing device 102 is set to four, which reflects the actual thread 118a-c occupancy at a given point in time.

Figure 2:
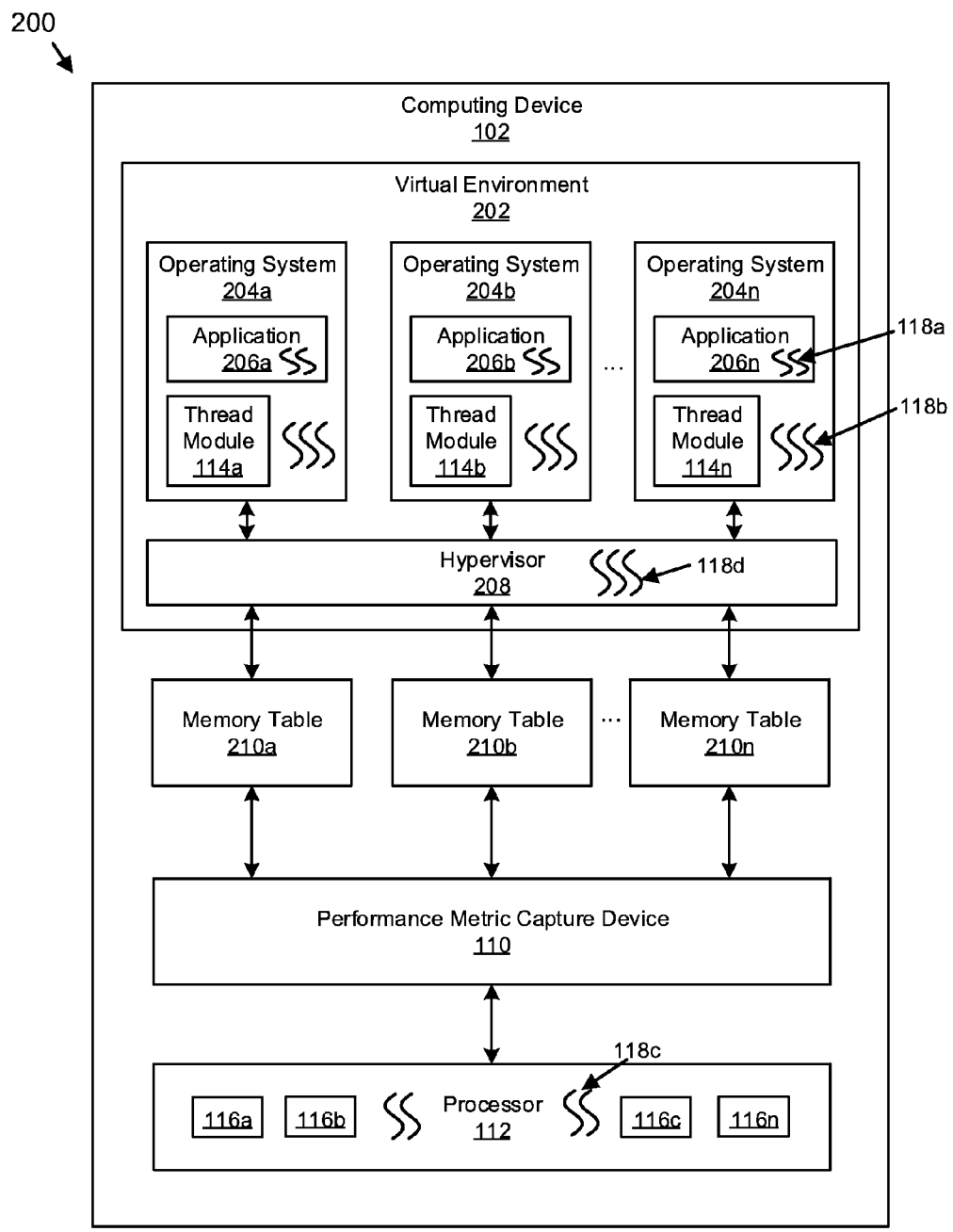
FIG. 2 is a schematic block diagram illustrating one embodiment of another system for monitoring performance of multithreaded workloads.

FIG. 2 depicts one embodiment of another system 200 for monitoring performance of multithreaded workloads. The depicted system 200 includes a computing device 102, a performance metric capture device 110, a processor 112, one or more processor cores 116a-n, one or more threads of execution 118a-d, and one or more thread modules 114a-n, which may be substantially similar to the computing device 102, the performance metric capture device 110, the processor 112, the one or more processor cores 116a-n, the one or more threads of execution 118a-c, and the thread module 114 illustrated and described with reference to FIG. 1. The system 200 depicted in FIG. 2 may also include a virtual environment 202, one or more operating systems 204a-n and applications 206a-n executing within the virtual environment 202, a hypervisor 208, and one or more memory tables 210a-n, which are described in more detail below.

The virtual environment 202, or virtual machine, may include software, systems, or programs that implement, manage, and/or control one or more guest operating systems 204a-n. For example, the virtual environment 202 may include a hypervisor 208 that one or more virtual instances, such as guest operating systems 204a-n, use to communicate with the physical hardware of the computing device 102. Examples may include Oracle VirtualBox®, Parallels®, VMWare®, and Windows VirtualPC®. In some embodiments, the virtual environment 202 is installed within the host or main operating system 104 of the computing device 102. In another embodiment, the virtual environment 202 is installed as a "bare-bones" installation on the computing device 102.

The one or more operating systems 204a-n may include guest operating systems 204a-n that execute within the virtual environment 202. As used herein, the guest operating system 204a-n is either installed as a virtual operating system or as a disk partition, and may execute in addition to a host or main operating system 104 of the computing device 102. The guest operating systems 204a-n may also be known as logical partitions executing on the computing device 102. The guest operating systems 204a-n may each be the same type or version of an operating system 104 or a various types or versions of operating systems 104. For example, one guest operating system 204a-n may be Windows 7®, another guest operating system 204a-n may be an Ubuntu® distribution of Linux®, and yet another guest operating system 204a-n may be OS X®.

Furthermore, the guest operating systems 204a-n may include different applications 206a-n that have been developed for the particular operating system type and version. For example, a Windows 8® guest operating system 204a-n may execute applications 206a-n that cannot run on a Linux® or OS X® guest operating system 204a-n. Thus, each guest operating system 204a-n, including the applications 206a-n that execute within each guest operating system 204a-n, are independent of one another. Furthermore, each guest operating system 204a-n and/or application 206a-n may execute one or more threads 118a-b.

The virtual environment 202 may also include a hypervisor 208, or virtual machine monitor ("VMM"). The hypervisor 208, as used herein, is a piece of computer software, firmware or hardware that creates and/or runs virtual machines and presents the guest operating systems 204a-n with a virtual operating platform and manages the execution of the guest operating systems 204a-n. As described above, multiple instances of a variety of operating systems 204a-n may share the virtualized hardware resources, which are managed by the hypervisor 208. The hypervisor 208 allows multiple guest operating systems 204a-n to share physical hardware resources of the computing device 102, such as the processor 112. In some embodiments, the hypervisor 208 executes one or more threads 118d.

The hypervisor 208 may be in communication with one or more memory tables 210a-n that store performance data collected, tracked, generated, or otherwise captured by the performance metric capture device 110. Similar to the system 100 of FIG. 1, the performance metric capture device 110 captures performance data associated with different threads 118a-d and stores it in one or more memory tables 210a-n. The memory tables 210a-n may each be associated with a corresponding guest operating system 204a-n and/or one or more applications 206a-n executing within the guest operating systems 204a-n. Accordingly, the performance metric capture device 110 may capture performance data associated with the threads 118a-d and with the processor 112, and/or processor core 116a-n, a guest operating system 204a-n and/or one or more applications 206a-n executing within the guest operating systems 204a-n and store the data in the corresponding memory table 210a-n. In this manner, each guest operating system 204a-n or logical partition may receive performance data for its threads 118a-d from a memory table 210a-n specifically associated with the guest operating system 204a-n and not performance data associated with other guest operating systems 204a-n.

In some embodiments, when a new logical partition or guest operating system 204a-n is created, a new memory table 210a-n is instantiated such that performance data captured by the performance metric capture device 110 associated with the new guest operating system 204a-n can be stored in the memory table 210a-n for the new guest operating system 204a-n.

Figure 3:
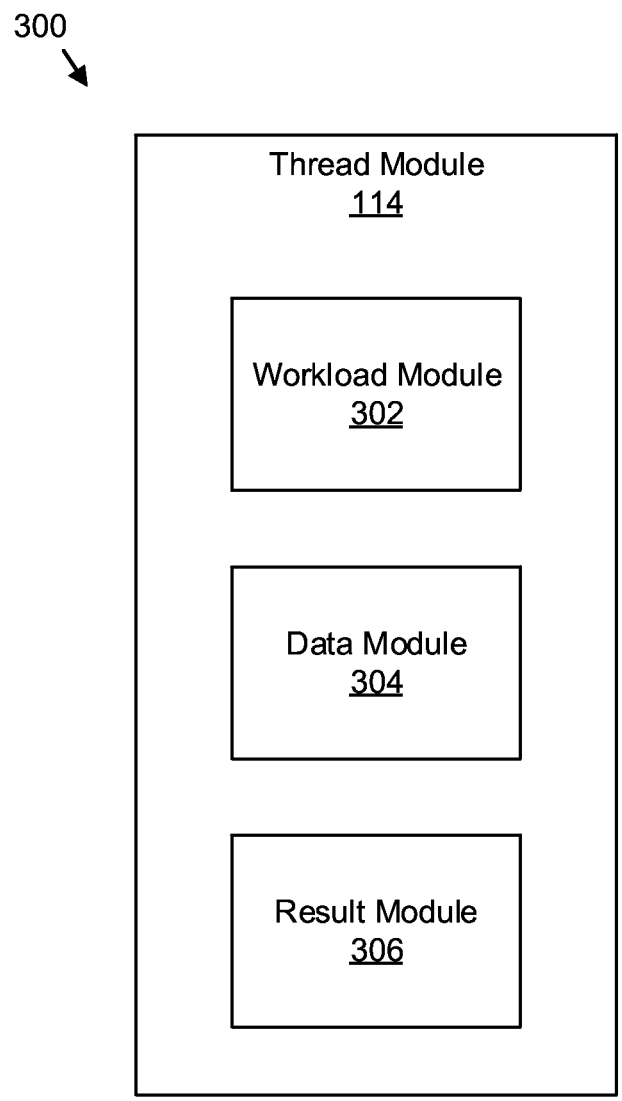
FIG. 3 is a schematic block diagram illustrating one embodiment of a module for monitoring performance of multithreaded workloads.

FIG. 3 depicts one embodiment of a module 300 for monitoring performance of multithreaded workloads. In one embodiment, the module 300 includes an instance of a thread module 114. The thread module 114 may include one or more of a workload module 302, a data module 304, and a result module 306, which are described in more detail below.

The workload module 302, in one embodiment, is configured to start a workload where the workload includes one or more threads 118*a-c* executing on a computing device 102. As used herein, a workload includes an amount of processing that the computing device 102 has been given to do at a given time. For example, a workload may include one or more applications, databases, processes, services, etc., that include a number of instructions for a processor 112 to process. In some embodiments, the workload has a known startup or ramp-up time before it reaches a steady state. As used herein, the steady state of a workload is reached when variations in data processing rates fall within a predetermined bound or threshold over a predetermined time period. In certain embodiments, the term steady state may be applied to almost any performance component in the system. In the context of a hardware thread 118*a-c*, for example, the steady state may be reached when caches, directories, and local memory exhibit stable levels of incoming and/or outgoing instruction and data rates, e.g., levels of incoming and/or outgoing instruction and data rates that fall within a predefined data rate range, fall above or below a predetermined data rate threshold, or the like. Part of that stability may depend on establishing consistent interactions with associated software threads 118*a-c*. Furthermore, as used herein, the time period required by a thread 118*a-c* to reach a steady state is referred to as the startup or ramp-up time, which may be known, calculated, estimated, or the like for different workloads.

For example, a multithreaded workload may include an application and a database management system that maintains a database used by the application. The application and database management system may have measured, known, estimated, or predicted startup times such that the data module 304, described below, may know when it can begin requesting and/or receiving performance data for the threads 118*a-c* of the workload. The workload startup time, for example, may be two seconds before the workload reaches a steady state. After the startup time, the data module 304 may receive performance data generated by the performance metric capture device 110 concurrently for each thread 118*a-c* of the workload.

The data module 304, in one embodiment, is configured to receive a first set of performance data for each thread 118*a-c* of the workload. In certain embodiments, the data module 304 receives a first set of performance data after the workload reaches a steady state, e.g., after the known workload startup time has surpassed, which may be used to characterize the performance of the workload during the workload's execution. In some embodiments, the data module 304 receives performance data for the threads 118*a-c* of the workload during the workload startup time, which may be used to characterize the performance of the workload during the startup time. As described above, the performance data includes data associated with software and/or hardware threads 118*a-c* of execution for the workload, the processor 112, a processor core 116*a-n*, an operating system 104, an application 106*a-n*, or a combination of operating systems 104 and applications 106*a-n*.

The performance data may include data for different thread 118*a-c* and/or processor 112 events, such as an event for the number of processor clock cycles, an event for the percentage of time the processor 112 was busy, an event for the number of 32 MHz clock cycles performed, an event for the number of constant clock cycles performed while in a particular simultaneous multithreading mode/a user mode/a kernel mode, the number of instructions performed by overlapping threads 118*a-c* (e.g., threads 118*a-c* being executed simultaneously), the number of clock cycles consumed for overlapping threads 118*a-c*, the number of clock cycles consumed for threads 118*a-c* declared online by the operating system 104, or the like.

In certain embodiments, the performance data has been measured, generated, captured, collected, tracked, or the like by the performance metric capture device 110 at predetermined intervals. The predetermined intervals may be on the order of microseconds, but the performance metric capture device 110 may collect performance data at nanosecond intervals, millisecond intervals, second intervals, or the like. The performance metric capture device 110, in one embodiment, stores the performance data in one or more memory tables 108 that are accessible to requesting entities using an application programming interface ("API"), for example.

Because the performance data is stored in physical memory 108, the performance data can be quickly read from the memory 108 without any additional software processing overhead. Furthermore, the performance data can be received for each thread 118*a-c* at the same time. For example, if there are four threads 118*a-c* executing on the computing device 102, the performance data for each thread 118*a-c* can be received at the same time so that accurate performance assessments for each thread 118*a-c* can be produced. Moreover, because the performance data is generated at a microsecond granularity, it is more likely that performance data for threads 118*a-c* that execute for a short period of time will be captured, which provides a more accurate and complete view of the performance of each thread 118*a-c*.

The data module 304 is further configured to receive a second set of performance data for the threads 118*a-c* a predefined time interval after the first set of performance data is received. For example, the data module 304 may receive the second set of performance data one second after the first set of performance data is received. In a further embodiment, the second set of performance data corresponds to the first set of performance data. For example, if the data module 304 receives a first set of performance data that includes data for an event that counts the number of instructions performed for each thread 118*a-c* and an event that counts the number of constant clock cycles consumed for each thread 118*a-c*, the data module 304 would then receive a second set of performance data that includes data for an event that counts the number of instructions performed for each thread 118*a-c* and an event that counts the number of constant clock cycles consumed for each thread 118*a-c* a predefined time interval after the first set of performance data is received.

The second set of performance data may include updated performance data, i.e., performance data that has been modified, updated, changed, or the like during the predefined time interval. For example, the performance data for an event that counts the number of processor clock cycles consumed for a specific thread 118*a-c* may have changed from 2 million clock cycles to 5.2 million clock cycles within one second. In some embodiments, the predefined time interval may be configured or defined by a user (such as a system administrator), an operating system 104, an application 106*a-n*, or the like. The predefined time interval may be on the order of microseconds, milliseconds, seconds, or the like. For example, the data module 304 may receive the second set of performance data 256 microseconds after the data module 304 receives the first set of performance data.

In some embodiments, the data module 304 receives the performance data organized in one or more groups of performance events. In one embodiment, a group of performance events include performance data for events that measure similar performance characteristics. For example, Group 0 may include performance data for events associated with measuring clock cycle performance and Group 1 may include performance data for events associated with measuring the instruction count of a thread 118a-c. In certain embodiments, each thread 118a-c of execution has its own set of groups of performance data. For example, if four threads 118a-c are executing on the computing device 102 for a workload, each of the four threads 118a-c would have its own set of performance data for Group 0, Group 1, and so on. In other words, the performance metric capture device 110 stores data as groups in memory tables 108 for each thread 118a-c of execution.

In some embodiments, the data module 304 receives, concurrently for each executing thread 118a-c, performance data for each event of each group that is stored in the memory table 108. In another embodiment, the data module 304 receives performance data for predetermined or specific events. For example, the data module 304 may only be interested in performance data for an event that counts the number of processor clock cycles from Group 0 and an event that counts the number of instructions performed for a thread 118a-c from Group 2.

In a further embodiment, the data module 304 may configure which performance data to receive by specifying a group, an event, a thread 118a-c, a processor 112, a processor core 116a-n, an operating system 104, an application identifier (e.g., a process ID), a logical partition, or the like. For example, the data module 304 may receive performance data for an instruction count event for a thread 118a-c associated with a particular application 106a-n and a particular processor 112 or processor core 116a-n on the computing device 102.

In one embodiment, the result module 306 is configured to calculate one or more performance metrics for each thread 118a-c based on the first and second sets of performance data received by the data module 304. As described in more detail below, the result module 306 determines the performance metrics for each thread 118a-c of the workload based on differences between one or more thread events of the first and second sets of performance data captured by the performance metric capture device 110.

For example, the result module 306 may calculate the number of constant clock cycles for a core 116a-n simultaneous multithreading mode, a number of constant clock cycles consumed while a simultaneous multithreading mode is in one of a user mode and a kernel mode, a number of instructions performed by each thread 118a-c of the one or more threads 118a-c while a processor 112 is in a particular simultaneous multithreading mode, a number of clock cycles consumed by each thread 118a-c of the one or more threads 118a-c while a processor 112 is in a particular simultaneous multithreading mode, the number of clock cycles consumed for each thread 118a-c determined or declared to be online by an operating system 104 of the computing device 102, the number of instructions per second performed by each thread 118a-c, and/or the like, for a given time interval. In certain embodiments, the result module 306 calculates the one or more performance metrics using constant clock cycles to ensure that variations in the processor 112 clock frequency, which may be in the range of −50% to +20% of a nominal frequency, does not negatively impact the computation of the performance metrics.

Traditionally, performance metrics and performance assessments for threads 118a-c are computed based on performance data obtained by a performance monitoring facility in hardware. This facility, however, generally needs to be configured by a software application that intends to consume the performance data, such as an operating system 104, an application 106a-n, a hypervisor 208, or the like. As a result, software or application layer support is required to maintain and configure the performance monitoring facility, which adds overhead, consumes processor clock cycles, and/or introduces errors that can produce crashes and affect the overall stability of the computing device 102. In other words, traditional methods for capturing performance metrics and monitoring the performance of threads 118a-c of a multithreaded workload require intervention from a user, an operating system 104, an application 106a-n, and/or any other application layer entity.

In addition to performance overhead, traditional methods for capturing performance metrics and monitoring the performance of threads 118a-c of a multithreaded workload cause interrupt interference due to the frequent interrupt messages or signals that are sent on behalf of the performance monitoring facility. This may compromise execution of the entities at the application layer, such as an operating system 104 or an application 106a-n, by causing the entities at the application layer to service the interrupt notifications.

In order to compensate for the frequency of the monitoring interruptions, traditional methods for capturing performance metrics and monitoring the performance of threads 118a-c of a multithreaded workload measure performance data at larger timing intervals on the order of hundreds of milliseconds or seconds. While this may reduce the amount of monitoring interruptions serviced at the application layer, sampling performance data at increased timing intervals causes the performance data to improperly characterize the multithreaded workload because the execution rate of the threads 118a-c can vary during the interval. For example, if performance data is captured at 300 millisecond intervals, the performance data for a thread 118a-c that executes faster than 300 milliseconds will not be captured and will be lost as a result. Consequently, the performance metrics generated for that thread 118a-c will be inaccurate. Thus, as described herein, because the performance metric capture device 110 generates or captures performance data for each thread 118a-c on the order of microseconds, a more complete performance assessment for each thread 118a-c can be created.

Moreover, unlike traditional methods, the subject matter disclosed herein describes capturing performance metrics and monitoring the performance of threads 118a-c of a multithreaded workload using a performance metric capture device 110 that is "always-on," meaning that the performance metric capture device 110 is activated when the processor 112 and/or the computing device 102 is powered on. As a result, performance data for the processor 112 and the threads 118a-c is constantly being monitored and collected from the time that the computing device 102 is powered on until the computing device 102 is powered off. By virtue of being "always-on," the performance metric capture device 110 does not require being configured by a user, an operating system 104, an application 106a-n, a hypervisor 208, and/or any other application layer entity before it can begin monitoring or capturing performance data. Consequently, entities at the application layer, such as an operating system 104 and/or an application 106*a-n*, can consume data generated and stored by the performance metric capture device 110 to compute performance metrics for the threads 118*a-c* without intervening in the configuration of the performance metric capture device 110.

Thus, the subject matter disclosed herein for monitoring the performance of threads 118*a-c* of a multithreaded workload is non-intrusive, meaning that it does not require users or entities at the application layer to configure the performance metric capture device 110. Accordingly, by removing the user and/or entities at the application layer from the configuration of the performance metric capture device 110, the reliability of the performance metric capture device 110 and/or the application layer entities is increased because configuration errors or other issues can be eliminated. Moreover, the resulting performance metric calculations for the threads 118*a-c* are more accurate because the performance data is captured by the performance metric capture device 110 on the order of microseconds, instead of on the order of hundreds of milliseconds or more. More accurate performance metric calculations for threads 118*a-c* can provide a more complete performance assessment for each thread 118*a-c* of the multithreaded workload that is concurrently executing on the computing device 102.

Furthermore, unlike traditional thread 118*a-c* performance monitoring techniques, the subject matter disclosed herein obtains performance data concurrently, or at the same time, for each thread 118*a-c* that is executing simultaneously on the computing device 102. For example, for each thread 118*a-c* of execution, performance data for events such as the number of instructions performed per thread 118*a-c*, the number of cycles consumed per thread 118*a-c*, or the like, can be received at the same time. This allows multiple concurrent views of a multithreaded workload's performance to be generated.

Figure 4:
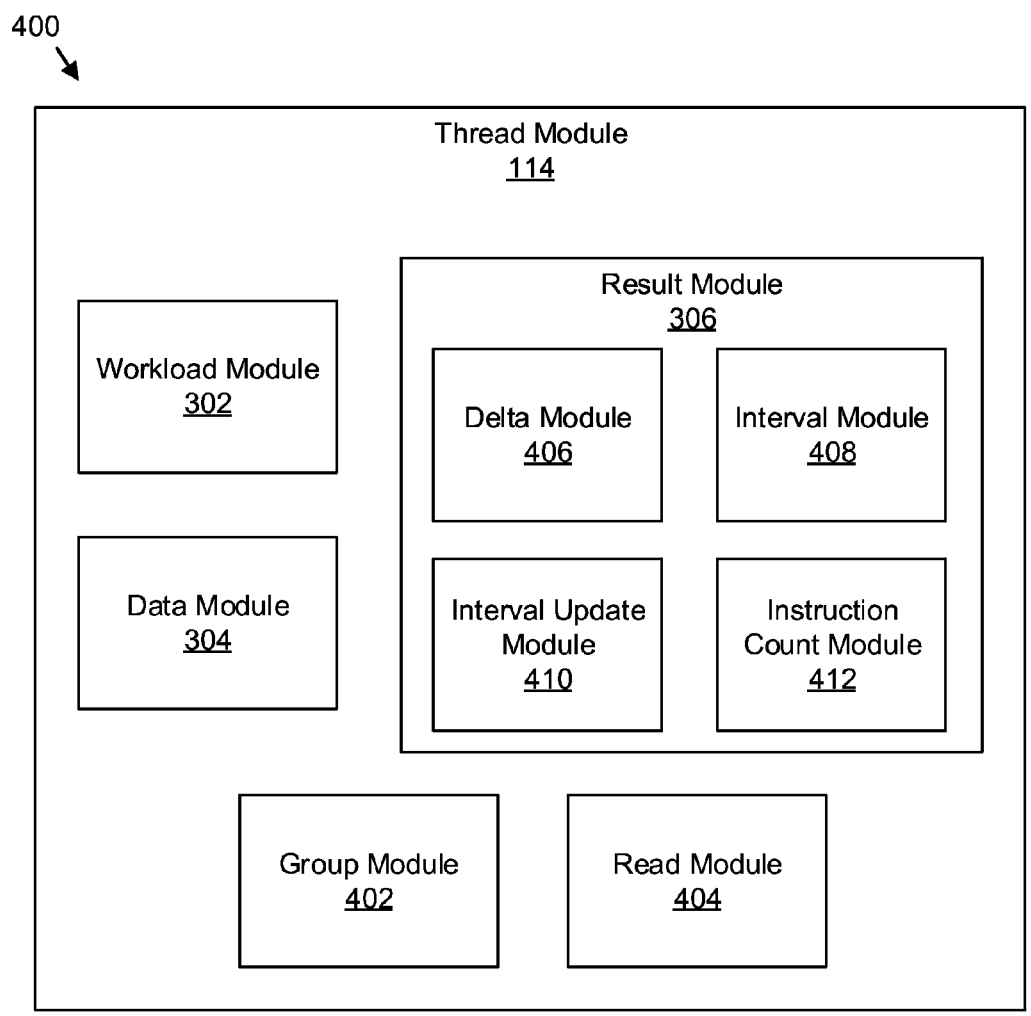
FIG. 4 is a schematic block diagram illustrating one embodiment of another module for monitoring performance of multithreaded workloads.

FIG. 4 depicts one embodiment of another module 400 for monitoring performance of multithreaded workloads. The module 400, in certain embodiments, includes an embodiment of a thread module 114. The thread module 114 may include one or more of a workload module 302, a data module 304, and a result module 306, which may be substantially similar to the workload module 302, the data module 304, and the result module 306 described above. The thread module 114 may also include one or more of a group module 402, a read module 404, a delta module 406, an interval module 408, an interval update module 410, and an instruction count module 412.

The group module 402, in one embodiment, is configured to determine one or more groups of the performance data that include one or more events for calculating one or more performance metrics for the threads 118*a-c* of the multithreaded workload. As described above, the performance data may be divided into a plurality of groups for each thread 118*a-c*, with each group including data for one or more thread 118*a-c* events. For example, Group 0 may include data for a group of events such as the number of constant clock cycle consumed while in a particular simultaneous multithreading mode, the number of instructions performed by a thread 118*a-c* in user mode/kernel mode, or the like. Similarly, Group 2 may include data for a group of events such as the number of instructions or clock cycles performed by overlapping threads 118*a-c*, the number of clock cycles consumed by each thread 118*a-c* the number of 32 MHz cycles that were performed during an interval, or the like.

Moreover, for each thread 118*a-c*, each group may be identified with a group identifier. Accordingly, the group module 402 may provide an event identifier, or the like to determine which groups include data for particular events that the result module 306 uses to calculate the performance metrics for the threads 118*a-c*. For example, the groups of performance data may be identified using a hash table, a lookup table, or the like and the group module 402 may provide a group or event identifier as a key into the lookup table to determine which group the performance data for the event belongs to.

The read module 404, in one embodiment, is configured to read the performance data from a memory table 108. The read module 404 may be used by the data module 304 to receive performance data concurrently for each thread 118*a-c* from the memory table 108. In certain embodiments, the memory table 108 may include computer memory in the form of one or more registers (a small amount of storage associated with the processor 112 that can be accessed faster than other memory types), caches, RAM, etc., that store performance data, and the read module 404 may read the performance data from the registers.

The read module 404, in another embodiment, may read performance data from the memory table 108 using one or more counters and a counter identifier. For example, the read module 404 may specify a counter identifier such as CS_CORE_MODE_SMT4_CCYC, which may specify the counter for the event that counts the number of constant clock cycles consumed while the core simultaneous multithreading mode was set to four, or 4THRD_NON_IDLE_INST, which may specify the counter for the event that counts the number of instructions that were executed when exactly four hardware threads 118*a-c* were non-idle while the workload was executing, or the like. The counter identifiers may correspond to the thread event that performance data is being read for. In certain embodiments, if a hypervisor 208 is used to manage one or more logical partitions on the computing device 102, the counters may include hypervisor performance monitoring counters ("HPMC").

In one embodiment, the read module 404 reads performance data from the memory table 108 using an application programming interface ("API"). In certain embodiments, the read module 404 is part of, or otherwise uses, a hypervisor interface or API to read the performance data from the memory table 108. For example, the read module 404 may use a set of functions provided by a memory table 108, a performance metric capture device 110, or a hypervisor 208 to access performance data by providing parameters for group information, event information, thread information, processor information, processor core information, logical partition information, application information, operating system information, memory table information, or the like.

In one embodiment, the delta module 406 is configured to determine a difference between the performance data counts between the first set and the second set of performance data for each thread 118*a-c* during the timing interval for each event of a plurality of events, which may be in the same or separate event groups, used for the calculation of the performance metrics for each thread 118*a-c*. For example, to calculate the number of constant clock cycles consumed for each thread 118*a-c* concurrently while the simultaneous multithreading mode for a core 116*a-n* is four, meaning that there were four hardware threads 118*a-c* in a non-idle state during the interval period, the delta module 406 may calculate the difference between the first set of performance data and the second set of performance data for the event CS_CORE_MODE_SMT4_CCYC. The delta module 406 may calculate the number of constant clock cycles consumed for each thread 118a-c concurrently for different core 116a-n simultaneous multithreading modes using the mode-specific events, e.g., CS_CORE_MODE_SMT2_CCYC for two non-idle threads 118a-c, CS_CORE_MODE_SMT6_CCYC for six non-idle threads 118a-c, CS_CORE_MODE_SMT8_CCYC for eight non-idle threads 118a-c, and/or the like.

The delta module 406, in another embodiment, calculates the number of cycles consumed for each thread 118a-c that were in either a user mode or a kernel mode for a particular core 116a-n simultaneous multithreading mode. For example, to calculate the number of user mode constant clock cycles consumed for each thread 118a-c concurrently while the simultaneous multithreading mode for a core 116a-n is four, the delta module 406 may calculate the difference between the first set of performance data and the second set of performance data for the event CS_CORE_MODE_SMT4_CCYC_USER. Likewise, to calculate the number of kernel mode constant clock cycles consumed for each thread 118a-c concurrently while the simultaneous multithreading mode for a core 116a-n is four, the delta module 406 may calculate the difference between the first set of performance data and the second set of performance data for the event CS_CORE_MODE_SMT4_CCYC_KERNEL. The delta module 406 may calculate similar metrics for different core 116a-n simultaneous multithreading modes, e.g., CS_CORE_MODE_SMT2_CCYC_USER/KERNEL for two non-idle threads 118a-c, CS_CORE_MODE_SMT6_CCYC_USER/KERNEL for six non-idle threads 118a-c, CS_CORE_MODE_SMT8_CCYC_USER/KERNEL for eight non-idle threads 118a-c, and/or the like.

The delta module 406, in another embodiment, calculates the number of instructions that were executed concurrently by each overlapping thread 118a-c, or threads 118a-c that were executing at the same time. The delta module 406, for example, may calculate the difference between the first and second sets of performance data using the event 4THRD_NON_IDLE_INST to determine the number of instructions that were performed for each thread 118a-c of four non-idle threads 118a-c that executed during the interval period. Likewise, the delta module 406 calculates the number of clock cycles that were consumed by each overlapping thread 118a-c. The delta module 406, for example, may calculate the difference between the first and second sets of performance data using the event 4THRD_NON_IDLE_CCYC to determine the number of clock cycles that were consumed by each thread 118a-c of four non-idle threads 118a-c that executed during the interval period. The delta module 406 may use similar events for different numbers of non-idle threads 118a-c that overlap during the interval period, e.g., 3THRD_NON_IDLE_INST/CCYC for three non-idle threads 118a-c, 6THRD_NON_IDLE_INST/CCYC for six non-idle threads, 118a-c, 7THRD_NON_IDLE_INST/CCYC for seven non-idle threads 118a-c, or the like.

Furthermore, the delta module 406 may calculate the number of constant clock cycles consumed for each thread 118a-c that the operating system 104 declares to be online. As discussed above, the operating system 104 may declare a thread 118a-c to be online even if the thread 118a-c is not currently doing useful work, but is available to perform work. The delta module 406, for example, may calculate the difference between the first and second sets of performance data using the event TC_2_CCYC to determine the number of constant clock cycles that were consumed for each thread 118a-c of two online threads 118a-c that executed during the interval period. The delta module 406 may use similar events for different numbers of online threads 118a-c during the interval period, e.g., TC_3_CCYC for three online threads 118a-c, TC_5_CCYC for five online threads, 118a-c, TC_8_CCYC for eight online threads 118a-c, or the like. The number of constant clock cycles consumed by threads 118a-c declared to be online by an operating system 104 provides an operating system's view of the thread level utilization for the workload.

As discussed above, the performance metrics calculated by the delta module 406 are calculated using performance data that is read, fetched, obtained, or received concurrently, or otherwise at substantially the same time, for each simultaneously executing thread 118a-c such that multiple, concurrent views of the multithreaded workload's performance can be generated, which provides a more complete and accurate performance assessment of each thread 118a-c associated with the workload.

In a further embodiment, the result module 306 calculates the number of instructions performed per second for each thread 118a-c of execution of the multithreaded workload. The interval module 408, in one embodiment, is configured to determine a measurement period clock for a group of performance data as a function of the measurement period interval ("MPI"). As used herein, a measurement period interval is the time interval for each event or each group of events between when performance data for an event or group of events is recorded, generated, captured, stored, tracked, or otherwise collected by the performance metric capture device 110. Each group of performance data has an associated MPI that is read with the performance data. Thus, Group 1 would have an MPI denoted by meas_period_int_group1, Group 2 would have an MPI denoted by meas_period_int_group2, and so on.

The interval module 408, in one embodiment, normalizes the MPI for a group of performance data to be measured in terms of a clock rate. Initially, the interval module 408 determines a time to complete a number of completed cycles at a fixed frequency clock rate as a function of the number of completed cycles at the fixed frequency clock rate and a time to complete one cycle at the fixed frequency clock rate. For example, if the fixed frequency clock rate is 32 MHz, and the time it takes to complete one 32 MHz cycle is $1/(32\times10^6)$ seconds, then the time to complete the number of completed cycles, in seconds, at 32 MHz (denoted by GROUP2_32 MHZ_CYC) is:

time_group2_32 mhz_cyc=GROUP2_32 MHZ_CYC×1/$(32\times10^6)$, where GROUP2_32 MHZ_CYC is the event that counts the number of 32 MHz cycles that are performed during the interval. In this example, this event is located in Group 2.

The interval module 408 in one embodiment is further configured to determine the time it takes to update the MPI by one as a function of the time to complete the number of completed cycles at the fixed frequency clock rate and the second delta measurement period interval. Thus, continuing with the example above that uses a 32 MHz clock speed, the time it takes to update the MPI is:

time_update_MPI_group2=time_group2_32 mhz_cyc/meas_period_int_group2

The interval module 408, in another embodiment, is configured to determine the measurement period interval clock by inverting the time it takes to update the MPI by one. Thus, for a 32 MHz clock speed as the baseline, the measurement period interval clock is:

meas_period_int_clock=1/
time_update_MPI_group2=meas_period_int_group2/time_group2_32 mhz_cyc The interval update module 410, in one embodiment, determines a time it takes to update the MPI for a group of performance data, for each thread 118*a-c*, as a function of the calculated measurement period clock. Continuing with the example above, the interval update module 410 may determine the time spent for updating the performance data in Group 4 for a thread 118*a-c* of the plurality of threads 118*a-c* executing on the computing device 102, i.e., the time spent updating the MPI for Group 4 in terms of the measurement period clock. Thus, for Group 4, the time spent to update the performance data for a particular thread 118*a-c* would be:

time_group4_1THRD=(1/meas_period_int_clock)×meas_period_int_group4

The interval update module 410, in some embodiments, iterates through the groups of performance data for each thread 118*a-c* and calculates the time it takes to update the MPI for each group of performance data for each thread 118*a-c*. Thus, the time it takes to update the MPI for thread 2 may be time_group4_THRD2, and so on.

The instruction count module 412, in one embodiment, is configured to determine a number of instructions executed per second for each thread 118*a-c* of the workload as a function of a number of instructions executed for a thread 118*a-c* and the time it takes to update the MPI. For example, if there are four threads 118*a-c* executing on the computing device 102, the instruction count module 412 calculates the number of instructions performed per second (IPS) for each thread 118*a-c*. Thus, the IPS for thread 1 would be:
1THRD_IPS=1THRD_NON_IDLE_INST/time_group4_1THRD, where 1THRD_NON_IDLE_INST is the event described above that counts the number of instructions performed by thread 1 while it was non-idle during the interval period. Likewise, the IPS for threads 2-4 would be:

2THRD_IPS=2THRD_NON_IDLE_INST/
time_group4_2THRD,

3THRD_IPS=3THRD_NON_IDLE_INST/
time_group4_3THRD, and

4THRD_IPS=4THRD_NON_IDLE_INST/
time_group4_4THRD, and so on.

The thread IPS calculations, together with the performance metrics calculated above by the delta module 406, provide a more comprehensive picture of the thread level utilization of the workload during the course of the workload's execution. Moreover, the calculated performance metrics may be a more accurate and complete representation of the thread level utilization due to the fact that the performance data for each thread 118*a-c* is captured by a performance metric capture device 110 at a microsecond granularity and can be read concurrently for each thread 118*a-c*.

Furthermore, as described above, the performance data is captured in a non-intrusive manner (e.g., without requiring configuration or communication between the performance metric capture device 110 and application layer entities) to avoid errors or failures associated with configuring the performance metric capture device 110 using an operating system 104, an application 106*a-n*, and/or a hypervisor 208. This can improve the reliability of the operating system 104, or other entities executing at the application layer, during performance data measurements.

Moreover, processor cycles that were normally used by the operating system 104, or another application 106*a-n*, during configuration of the performance metric capture device 110 and/or during data generation can be conserved or used for other processes because the operating system 104 is not required to intervene during configuration of the performance metric capture device 110 and/or during data generation.

In certain embodiments, monitoring the performance of a multithreaded workload may be an ongoing process that occurs at predetermined intervals during the lifetime of the workload. After the performance metrics for each thread 118*a-c* have been calculated as described above, for example, the data module 304 may receive a third set of performance data for each thread 118*a-c* a period of time after the second set of performance data is received. The third set of performance data may be received concurrently for each thread 118*a-c* of the workload. The result module 306 may then calculate the one or more performance metrics for each thread 118*a-c* based on the second set of performance data and the third set of performance data, and so on.

Figure 5:
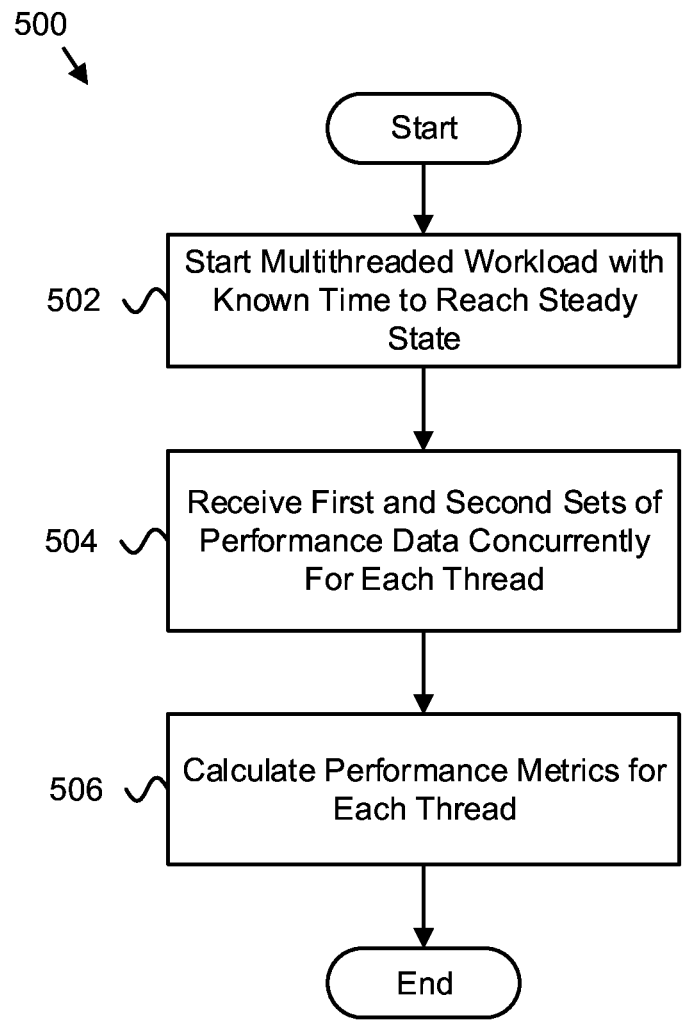
FIG. 5 is a schematic flow chart diagram illustrating one embodiment of a method for monitoring performance of multithreaded workloads.

FIG. 5 is a schematic flow chart diagram illustrating one embodiment of a method 500 for monitoring performance of multithreaded workloads. In one embodiment, the method 500 begins, and the method 500 starts 502 a workload comprising one or more threads 118*a-c* executing on a computing device 102. In some embodiments, the workload module 302 starts 502 the workload comprising one or more threads 118*a-c* executing on the computing device 102. In a further embodiment, the workload reaches a steady state after a period of time, e.g., after the known startup period for the workload.

The method 500, in certain embodiments, receives 504 a first set of performance data for each thread 118*a-c* of the one or more threads 118*a-c* in response to the workload reaching the steady state. In one embodiment, the data module 304 receives 504 the first set of performance data. The first set of performance data may be received 504 concurrently for each thread 118*a-c* of the one or more threads 118*a-c*. The method 500, in a further embodiment, receives 504 a second set of performance data for each thread 118*a-c* of the one or more threads 118*a-c* a period of time after the first set of performance data is received. In one embodiment, the data module 304 receives 504 the second set of performance data. In some embodiments, the second set of performance data is received 504 concurrently for each thread 118*a-c* of the one or more threads 118*a-c*.

In one embodiment, the method 500 calculates 506 one or more performance metrics for each thread 118*a-c* of the one or more threads 118*a-c* based on the first and second sets of performance data. In certain embodiments, a result module 306 calculates 506 the one or more performance metrics for each thread 118*a-c* of the one or more threads 118*a-c* based on the first and second sets of performance data, and the method 500 ends.

Figure 6:
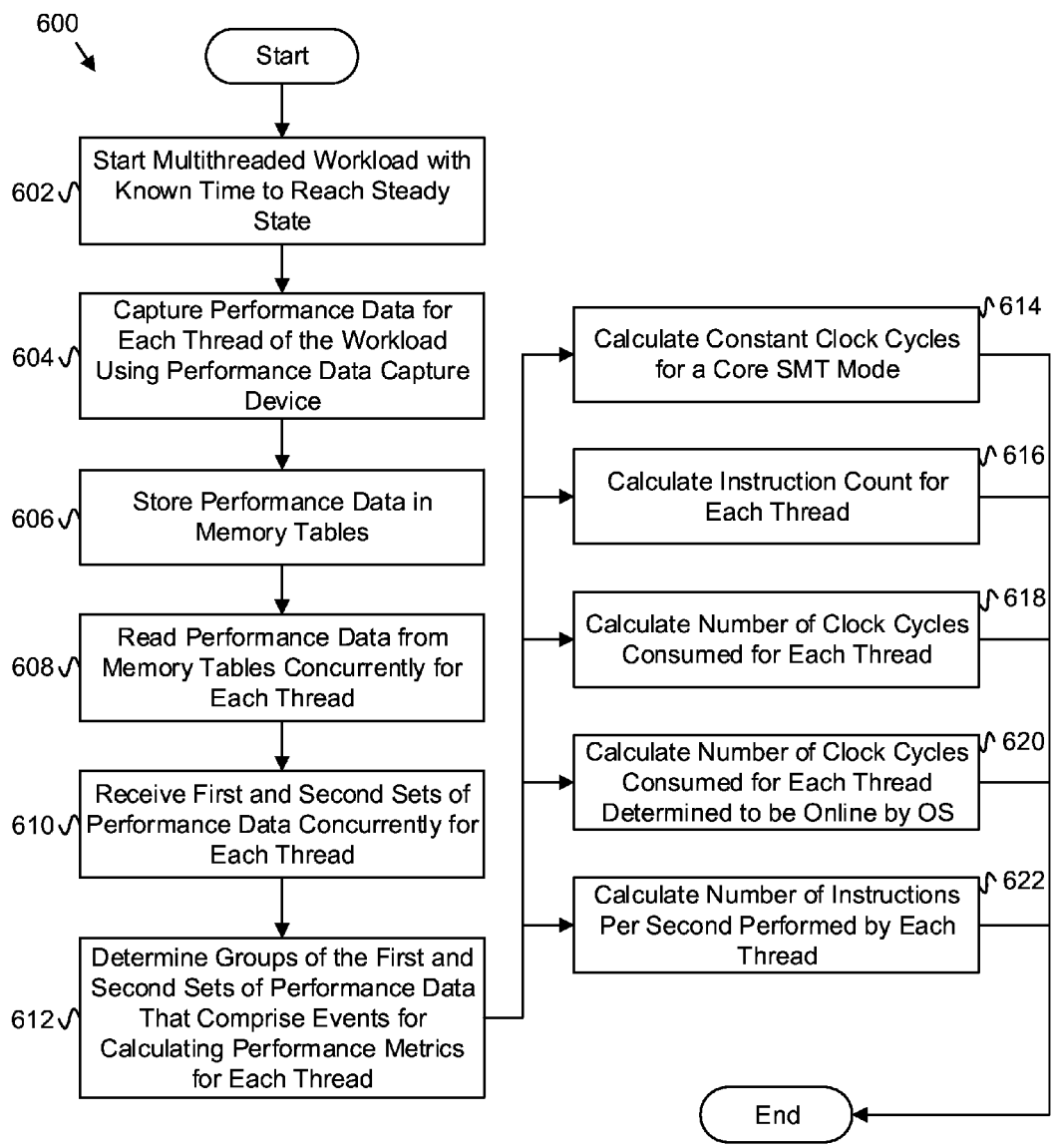
FIG. 6 is a schematic flow chart diagram illustrating one embodiment of another method for monitoring performance of multithreaded workloads.

FIG. 6 is a schematic flow chart diagram illustrating one embodiment of another method for monitoring performance of multithreaded workloads. In one embodiment, the method 600 begins, and the method 600 starts 602 a workload comprising one or more threads 118*a-c* executing on a computing device 102. In some embodiments, the workload module 302 starts 602 the workload comprising one or more threads 118*a-c* executing on the computing device 102. In a further embodiment, the workload reaches a steady state after a known period of time, e.g., after the known startup period for the workload.

The method 600, in one embodiment, captures 604 performance data for each thread 118a-c of the workload during the lifetime of the workload. In certain embodiments, the performance metric capture device 110 captures 604 the performance data for each thread 118a-c. Furthermore, the method 600 may store 606 the captured performance data in one or more memory tables 108. In some embodiments, the performance metric capture device 110 stores 606 the captured performance data in the one or more memory tables 108.

In one embodiment, the method 600 reads 608 performance data concurrently for each thread 118a-c from the memory tables 108. In certain embodiments, the read module 404 reads 608 the performance data concurrently for each thread 118a-c from the memory tables. In a further embodiment, the method 600 receives 610 a first set of performance data for each thread 118a-c of the one or more threads 118a-c in response to the workload reaching the steady state. In one embodiment, the data module 304 receives 610 the first set of performance data. The first set of performance data may be received 610 concurrently for each thread 118a-c of the one or more threads 118a-c.

The method 600, in a further embodiment, receives 610 a second set of performance data for each thread 118a-c of the one or more threads 118a-c a period of time after the first set of performance data is received. In one embodiment, the data module 304 receives 610 the second set of performance data. In some embodiments, the second set of performance data is received 610 concurrently for each thread 118a-c of the one or more threads 118a-c.

The method 600, in one embodiment, determines 612 one or more groups of the first and second sets of performance data that include one or more events associated with calculating the one or more performance metrics for the one or more threads 118a-c. In some embodiments, a group module 402 determines 612 the one or more groups of the first and second sets of performance data that include one or more events associated with calculating the one or more performance metrics for the one or more threads 118a-c.

The method 600, in certain embodiments, calculates one or more performance metrics for the one or more threads 118a-c based on the performance data in the determined groups. The method 600 may calculate 614 the number of constant clock cycles for a core 116a-n simultaneous multithreading mode. The method 600, in another embodiment, calculates 616 the instruction count for each thread 118a-c. The method 600, in a further embodiment, calculates 618 the number of clock cycles consumed for each thread 118a-c. In yet another embodiment, the method 600 calculates 620 the number of clock cycles consumed for each thread 118a-c determined or declared to be online by an operating system 104 of the computing device 102. The method 600 may also calculate 622 the number of instructions per second performed by each thread 118a-c. In some embodiments, one or more of the result module 306, the delta module 406, the interval module 408, the interval update module 410, and the instruction count module 412 calculates one or more of the foregoing performance metrics, and the method 600 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a performance metric capture device that continuously captures performance data for one or more threads of a workload, the performance metric capture device comprising a hardware device that is separate from, but communicatively coupled to, a processor executing the workload;
   a workload module that starts the workload comprising the one or more threads, the workload reaching a steady state after a period of time;
   a data module that:
      receives a first set of performance data for each thread of the one or more threads captured by the performance metric capture device in response to the workload reaching the steady state, the first set of performance data being received concurrently for each thread of the one or more threads; and
      receives a second set of performance data for each thread of the one or more threads captured by the performance metric capture device a period of time after the first set of performance data is received, the second set of performance data being received concurrently for each thread of the one or more threads; and
   a result module that calculates one or more performance metrics for each thread of the one or more threads based on the first and second sets of performance data.

2. The apparatus of claim 1, wherein the performance data for each thread of the one or more threads is continuously captured according to a predetermined time interval while the computing device is powered-on.

3. The apparatus of claim 2, wherein the predetermined time interval is on an order of microseconds.

4. The apparatus of claim 1, wherein the performance data is divided into a plurality of groups and stored in one or more memory elements of the computing device.

5. The apparatus of claim 4, wherein the plurality of groups of performance data for each thread of the one or more threads are read from the one or more memory elements at a same time.

6. The apparatus of claim 4, wherein each group of the plurality of groups comprises performance data for a plurality of events, the performance data comprising counts for a plurality of different events associated with each thread of the one or more threads.

7. The apparatus of claim 6, further comprising a group module that determines one or more groups of the plurality of groups that comprise one or more events associated with calculating the one or more performance metrics for the one or more threads.

8. The apparatus of claim 6, wherein the plurality of groups comprises one or more events that count one or more of:
   constant clock cycles consumed while a processor is in a particular simultaneous multithreading mode;
   constant clock cycles consumed while a simultaneous multithreading mode is in one of a user mode and a kernel mode;
   instructions performed by each thread of the one or more threads while a processor is in a particular simultaneous multithreading mode;
   clock cycles consumed by each thread of the one or more threads while a processor is in a particular simultaneous multithreading mode; and constant clock cycles consumed for each thread of the one or more threads that are declared online by an operating system.

9. The apparatus of claim 4, further comprising:
an interval module that determines a measurement period clock for a group of the plurality of groups;
an interval update module that determines a time it takes to update a measurement period interval for the group as a function of the measurement period clock; and
an instruction count module that determines a number of instructions executed per second for each thread of the one or more threads as a function of a number of instructions executed for a thread and the time it takes to update the measurement period interval.

10. The apparatus of claim 1, wherein the one or more calculated performance metrics comprise one or more of:
a number constant clock cycles consumed while a processor is in a particular simultaneous multithreading mode;
a number of constant clock cycles consumed while a simultaneous multithreading mode is in one of a user mode and a kernel mode;
a number of instructions performed by each thread of the one or more threads while a processor is in a particular simultaneous multithreading mode;
a number of clock cycles consumed by each thread of the one or more threads while a processor is in a particular simultaneous multithreading mode;
a number of constant clock cycles consumed by each thread of the one or more threads that are declared online by an operating system; and
a number of instructions per seconds performed by each thread of the one or more threads.

11. The apparatus of claim 1, wherein:
the data module receives a third set of performance data for each thread of the one or more threads a period of time after the second set of performance data is received, the third set of performance data being received concurrently for each thread of the one or more threads; and
the result module calculates the one or more performance metrics for each thread of the one or more threads based on the second set of performance data and the third set of performance data.

12. The apparatus of claim 1, wherein the workload comprises one or more multithreaded software applications that have a known startup period before reaching the steady state.

13. A method comprising:
starting a workload comprising one or more threads, the workload reaching a steady state after a period of time;
receiving a first set of performance data for each thread of the one or more threads in response to the workload reaching the steady state, the first set of performance data being received concurrently for each thread of the one or more threads, the performance data captured using a performance metric capture device that continuously captures performance data for the one or more threads of the workload, the performance metric capture device comprising a hardware device that is separate from, but communicatively coupled to, a processor executing the workload;
receiving a second set of performance data for each thread of the one or more threads captured by the performance metric capture device a period of time after the first set of performance data is received, the second set of performance data being received concurrently for each thread of the one or more threads; and
calculating one or more performance metrics for each thread of the one or more threads based on the first and second sets of performance data.

14. The method of claim 13, wherein the performance data for each thread of the one or more threads is continuously captured according to a predetermined time interval while the computing device is powered-on, the predetermined time interval is on an order of microseconds.

15. The method of claim 13, wherein the performance data is divided into a plurality of groups and stored in one or more memory elements of the computing device, the plurality of groups of performance data for each thread of the one or more threads being read from the one or more memory elements at a same time.

16. The method of claim 15, further comprising determining one or more groups of the plurality of groups that comprise one or more events associated with calculating the one or more performance metrics for the one or more threads, wherein each group of the plurality of groups comprises performance data for a plurality of events, the performance data comprising counts for a plurality of different events associated with each thread of the one or more threads.

17. The method of claim 15, further comprising:
determining a measurement period clock for a group of the plurality of groups;
determining a time it takes to update a measurement period interval for the group as a function of the measurement period clock; and
determining a number of instructions executed per second for each thread of the one or more threads as a function of a number of instructions executed for a thread and the time it takes to update the measurement period interval.

18. A computer program product comprising a computer readable storage medium having program instructions embodied therewith, the program instructions readable/executable by a processor to cause the processor to:
start, by processor, a workload comprising one or more threads, the workload reaching a steady state after a period of time;
receive, by processor, a first set of performance data for each thread of the one or more threads in response to the workload reaching the steady state, the first set of performance data being received concurrently for each thread of the one or more threads, the performance data captured using a performance metric capture device that continuously captures performance data for the one or more threads of the workload, the performance metric capture device comprising a hardware device that is separate from, but communicatively coupled to, a processor executing the workload;
receive, by processor, a second set of performance data for each thread of the one or more threads captured by the performance metric capture device a period of time after the first set of performance data is received, the second set of performance data being received concurrently for each thread of the one or more threads; and
calculate, by processor, one or more performance metrics for each thread of the one or more threads based on the first and second sets of performance data.

* * * * *